US012623669B2

(12) United States Patent
Fernandez et al.

(10) Patent No.: US 12,623,669 B2
(45) Date of Patent: May 12, 2026

(54) TIRE ANALYSIS METHOD AND SYSTEM FOR DETERMINING CHARACTERISTIC PARAMETERS OF AN AGRICULTURAL TRACTOR

(71) Applicant: Bridgestone Europe NV/SA [BE/BE], Zaventem (BE)

(72) Inventors: Juan Carlos Fernandez, Zaventem (BE); Antonio Fernandez, Madrid (ES); Maxim Gheorghe, Madrid (ES)

( * ) Notice: Subject to any disclaimer, the term of this patent is extended or adjusted under 35 U.S.C. 154(b) by 49 days.

(21) Appl. No.: 18/712,743

(22) PCT Filed: Nov. 25, 2022

(86) PCT No.: PCT/EP2022/083234
§ 371 (c)(1),
(2) Date: May 23, 2024

(87) PCT Pub. No.: WO2023/094574
PCT Pub. Date: Jun. 1, 2023

(65) Prior Publication Data
US 2025/0033651 A1      Jan. 30, 2025

(30) Foreign Application Priority Data
Nov. 25, 2021     (EP) .................................... 21210350

(51) Int. Cl.
*B60W 40/12* (2012.01)
*A01B 76/00* (2006.01)
(Continued)

(52) U.S. Cl.
CPC ............. *B60W 40/12* (2013.01); *A01B 76/00* (2013.01); *G01D 5/145* (2013.01); *G01S 11/02* (2013.01);
(Continued)

(58) Field of Classification Search
None
See application file for complete search history.

(56) References Cited

U.S. PATENT DOCUMENTS 4,809,785 A      3/1989   Arnold et al.
2007/0244605 A1*   10/2007   Hopkins .............. A01D 34/006
701/1
(Continued)

FOREIGN PATENT DOCUMENTS

JP        S61232924 A      10/1986
JP        H0735653 A      2/1995
(Continued)

OTHER PUBLICATIONS

Guy Ianto John et al: "An Analysis of the Interaction between the Front and Rear Axles of a Four-Wheel-Drive Tractor, and Its Contribution to Power Delivery Efficiency", Jan. 1, 2011 (Jan. 1, 2011), XP055914775, Retrieved from the Internet: URL:https://www.yumpu.com/en/document/view/32960216/an-analysis-of-the-interaction-b etween-the-front-and-rear-axles-of-a•[retrieved on Apr. 22, 2022] see 3.2.1, 3.3.2-3.3.5,3.4,3.5,3.6,3.6.3,3.6.4.
(Continued)

*Primary Examiner* — Lail A Kleinman
(74) *Attorney, Agent, or Firm* — Patterson Intellectual Property Law, PC

(57)      ABSTRACT

A tire analysis method and system for determining characteristic parameters of an agricultural tractor provided with two front wheels supporting two front tires and with two rear wheels supporting two rear tires. A first rotation sensor is mounted on a first wheel, a second rotation sensor is mounted on a second wheel; the agricultural tractor is driven along a straight path; while driving the agricultural tractor along the straight path, the total number of revolutions made by the first wheel and by the second wheel are measured; and (Continued)

at least one characteristic parameter is determined using the total number of revolutions made by the first wheel and by the second wheel.

20 Claims, 4 Drawing Sheets

(51) Int. Cl.
| | |
|---|---|
| *B60C 19/00* | (2006.01) |
| *G01D 5/14* | (2006.01) |
| *G01S 11/02* | (2010.01) |

(52) U.S. Cl.
CPC .... *B60C 2019/004* (2013.01); *B60C 2200/08* (2013.01); *B60W 2300/152* (2013.01)

(56) References Cited

U.S. PATENT DOCUMENTS

| | | |
|---|---|---|
| 2017/0008504 A1 | 1/2017 | Woopen et al. |
| 2018/0274968 A1 | 9/2018 | Brenninger |

FOREIGN PATENT DOCUMENTS

| | | |
|---|---|---|
| JP | H10506468 A | 6/1998 |
| JP | 2004067009 A | 3/2004 |
| JP | 2004350475 A | 12/2004 |
| JP | 2007105097 A | 4/2007 |
| JP | 2008296816 A | 12/2008 |
| JP | 2010266442 A | 11/2010 |
| JP | 4809785 B2 | 11/2011 |
| JP | 2017088043 A | 5/2017 |
| JP | 2021048788 A | 4/2021 |

OTHER PUBLICATIONS

Lagerhaus: "Reifenkauf-Landwirtschaft: Vorlaufberechnung und praktische Anwendung", Aug. 17, 2020 (Aug. 17, 2020), XP055914879, Retrieved from the Internet: URL:https://www.youtube.com/watch? v=yMaIMI eEHAc see the video frames.

Super User: "Vorlaufberechnung / Voreilung berechnen", Feb. 23, 2021 (Feb. 23, 2021), XP055914878, Retrieved from the Internet: URL:https://www.pneu-engeli.ch/diverses/fu er-die-landwirtschaft/ 178-vorlaufberechnun gen [retrieved on Apr. 23, 2022] p. 1-p. 3.

Janulevicius Algirdas et al: Dependencies of the Lead of Front Driving Wheels on Different Tire Deformations for a MFWD Tractor II , Transport, vol. 32, No. 1, Jul. 13, 2015 (Jul. 13, 2015), pp. 23-31, XP055914573, ISSN: 1648-4142, DOI: 10.3846/16484142. 2015.1063084 the whole document.

Janulevicius Algirdas et al: "Effect of variations in front wheels driving lead on performance of a farm tractor with mechanical front-wheel-drive", Journal of Terramechanics, Elsevier, Amsterdam, NL, vol. 77, Mar. 20, 2018 (Mar. 20, 2018), pp. 23-30, XP085372008,ISSN: 0022-4898, DOI:10.1016/J.JTERRA.2018.02. 002the whole document.

Tractor Tyre Expert: "Beware of the lead on four wheel drive tractors", Nov. 9, 2017 (Nov. 9, 2017), XP055914771, Retrieved from the Internet: URL:https://blog.bridgestone-agriculture.eu/ beware-of-the-lead-on-four-wheel-drive-t ractors [retrieved on Apr. 22, 2022] p. 1-p. 4.

Bridgestone Europe Nv: "Gro:Bere Traktorreifen für 35 % mehr Last", Oct. 6, 2020 (Oct. 6, 2020), XP055914594, Retrieved from the Internet: URL:https://www.bridgestone-agriculture.de /groessere-traktorreifen-fuer-35-mehr-last [retrieved on Apr. 21, 2022] p. 1-p. 5; figures.

International Search Report for corresponding patent application No. PCT/EP/2022/083234, dated Nov. 25, 2022, 5 pages.

Japanese Office Action, corresponding application No. JP2024531406A, Jun. 24, 2025, 5 pages.

\* cited by examiner

TIRE ANALYSIS METHOD AND SYSTEM FOR DETERMINING CHARACTERISTIC PARAMETERS OF AN AGRICULTURAL TRACTOR

TECHNICAL SECTOR

The present disclosure relates to a tire analysis method and a tire analysis system for determining characteristic parameters of an agricultural tractor.

BACKGROUND

In order to use four-wheel drive effectively, the running distance of front tires must be bigger than that of the rear tires—this is referred to as the lead ratio, and it is conditioned by the tires rolling circumferences and tractor's inter axle ratio. Tractor manufacturers normally recommend which tires can be mounted as standard, based on the rolling circumference data (at rated pressure and load, and full original tread depth) of new tires published by tire manufacturers. In many cases, several sizes are possible so long as they comply with the stipulated lead ratio. To use four-wheel drive effectively, the lead ratio should amount preferably to between +1% and +5% (the running distance of the front tires is longer than the running distance of the rear tires). The permitted lead ratio is normally accepted by the industry between 0% and +6%. A lead ratio less than 0% and greater than +6% can have a negative impact on the tractor's driving performance and steering behavior (particularly when less than 0%), and can cause excessive wear and tear in front and rear tires, as well as possible damages to the tractor's transmission. In four-wheel drive mechanisms, the relationship between the total number of revolutions of the front and rear axle is a constant factor (and is determined by the cogs in the gear box). This relationship is referred to as the inter axle ratio or transference ratio and, depending on the tractor brand and type, is normally between 1.20 and 1.50.

Once you know the rolling circumference for front and rear tires, as well as the tractor's inter axle ratio, it is possible to calculate the lead ratio with the following formula: (rolling circumference front tire*inter axle ratio/rolling circumference rear tire)−1.

But it is also necessary to consider that the standard calculations could be affected along the tractor's life, as many factors can affect to the rolling circumferences of the tires, for example the load per axle, the tire pressure applied by the customer, the wear rate, etc. or simply by replacing one axle worn out tires by new ones, and keeping in the other axle partially worn tires. All these situations will change the theoretical lead ratio and could therefore affect the proper performance of the tractor and/or tires.

Nowadays, at least three people are necessary for determining characteristic parameters of an agricultural tractor: one person driving the agricultural tractor along a test straight path and two persons looking at the tires to visually measure the total number of revolutions of the tires.

BRIEF SUMMARY

The aim of the present invention is to provide a tire analysis method and a tire analysis system for determining characteristic parameters of an agricultural tractor that are easy, quick and precise to implement. In particular, the tire analysis method and a tire analysis system of the present invention will easily help to verify and choose the best combinations of tires and/or the best set up for optimal performance.

According to the present invention, a tire analysis method and a tire analysis system for determining characteristic parameters of an agricultural tractor are provided, as set forth in the appended claims.

The claims describe preferred embodiments of the present disclosure forming an integral part of the present description.

BRIEF DESCRIPTION OF THE DRAWINGS

The present disclosure is now described in reference to the attached drawings, which illustrate a non-limiting exemplary embodiment, wherein.

DETAILED DESCRIPTION

Figure 1:
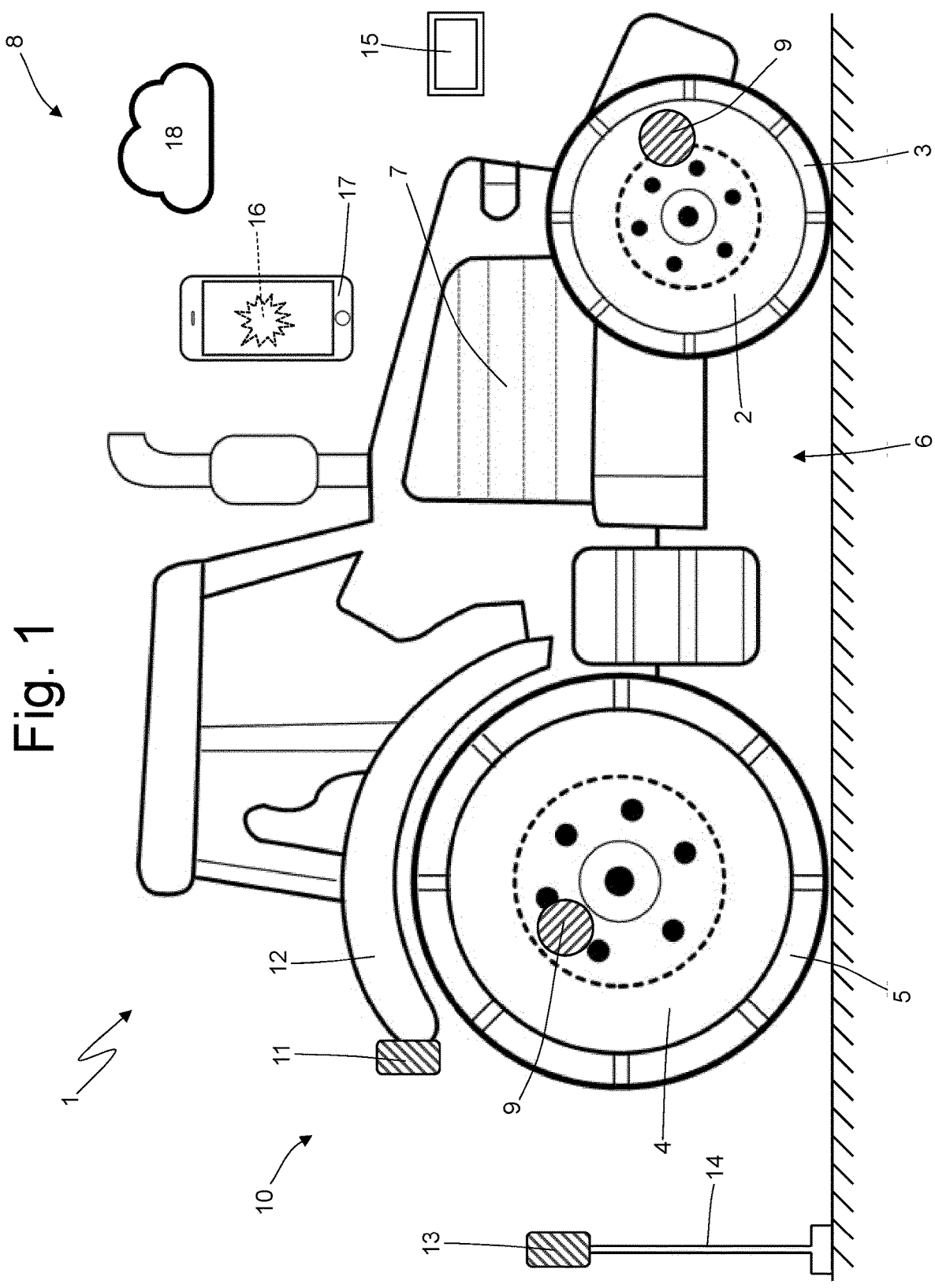
FIG. 1 is a schematic view of an agricultural tractor implementing the method of the present invention.

In FIG. 1 an agricultural tractor is indicated as a whole by the number 1.

The agricultural tractor 1 comprises two front wheels 2 (only one is visible in FIG. 1) equipped with two front tires 3, two rear wheels 4 (only one is visible in FIG. 1) equipped with two rear tires 5 (bigger than the front tires 3), and a four-wheel drive powertrain 6 which is powered by an internal combustion engine 7 and transmits the motion to all the four wheels 2 and 4 in the case of Mechanical Front Wheel Drive (MFWD) or Four Wheel Drive tractors (4WD).

The agricultural tractor 1 is provided by a tire analysis system 8 designed to determine some data connected to the wheels 2 and 4 and in particular to the tires 3 and 5 mounted on the wheels 2 and 4.

Figures 2, 3:
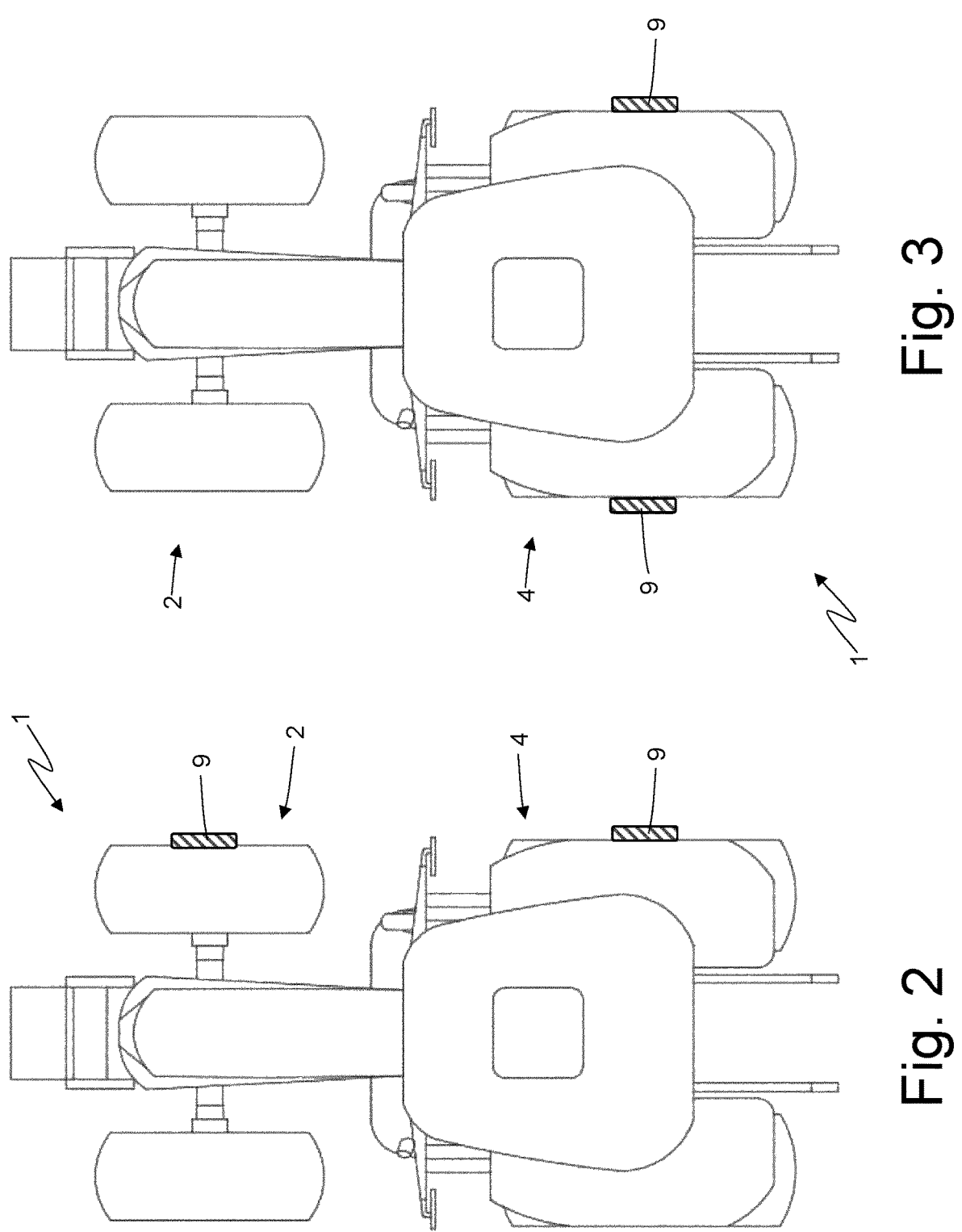
FIGS. 2 and 3 are two schematic and plan views of the agricultural tractor of FIG. 1 with different positioning of rotation sensors.

The tire analysis system 8 comprises (at least) two rotation sensors 9 coupled, in the embodiment shown in FIGS. 1 and 2, to the right front wheel 2 and to the right rear wheel 4; the (at least) two rotation sensors 9 are separate and independent from the agricultural tractor 1, i.e. they can be mounted on and dismounted from each wheel 2 or 4; each rotation sensor 9 is designed to measure the number of rotations made by each wheel 2 or 4. In the embodiment shown in FIGS. 1 and 2 the two rotation sensors 9 are coupled to the front and rear wheels 2 and 4 of the same (right) side, while in the embodiment shown in FIG. 3 the two rotation sensors 9 are coupled to the two rear wheels 4 of the same (rear) axle. According to a preferred embodiment, the rotation sensors 9 are developed by using Hall effect encoders and high quality bearings (of course other types of encoders could be used).

The tire analysis system 8 comprises a (at least one) distance sensor 10 designed to measure a (linear) distance D (shown in FIG. 6) traveled by the agricultural tractor 1. According to a preferred embodiment, the distance sensor 10 is formed by two different elements: a receiver 11 which is attached to a body 12 of the agricultural tractor 1 and a beacon 13 placed in a fixed position on the ground nearby the travelling path of the agricultural tractor 1. In particular, the beacon 13 is housed on a support 14 laying on the ground. According to a preferred embodiment, the receiver 11 is attached to the rearmost part of the body 12 of the agricultural tractor 1 and the beacon 13 is placed behind the agricultural tractor 1 (i.e. facing the receiver 11): in this manner the distance sensor 10 (composed by the receiver 11 and by the beacon 13) can measure without any interference the distance between the receiver 11 and the beacon 13 and thus can measure the distance D (shown in FIG. 6) traveled by the agricultural tractor 1. According to a preferred embodiment, the distance sensor 10 uses the Ultra Wideband (UWB) Technology and allows to determine the distance D (shown in FIG. 6) traveled by the agricultural tractor 1 with a precision of at least 5-10 centimeters.

It is preferable to attach the receiver 11 to the rearmost part of the body 12 of the agricultural tractor 1 and thus to place the beacon 13 behind the agricultural tractor 1 so that the metallic mass of the agricultural tractor 1 or attached equipment cannot (negatively) interfere with the electromagnetic waves exchanged between the receiver 11 and the beacon 13.

The tire analysis system 8 comprises a control unit (operating console) 15 which is wireless connected to the sensors 9 and 10 (for example using the Bluetooth® standard) so as to receive the measures from the sensors 9 and 10. The control unit 15 performs the system and operation management and the data collection.

The tire analysis system 8 can comprise a software application 16 running on a personal (portable) electronic device 17 like a mobile phone or a tablet computer. The software application 16 constitutes a Human-Machine Interface (HMI) for using the tire analysis system 8. The software application 16 can be used by an operator to manual input some data (agricultural tractor 1 data, tires 3 and 5 data, location . . . ) and to visualize the final reports. The software application 16 can memorized the agricultural tractor 1 (vehicle) data, the tires 3 and 5 data (size, brand, model, version, year, Remaining Tread Depth-RTD-, pressure, wear condition, photographs . . . ), the location, the date, and several sets of system readings.

The tire analysis system 8 can comprise also an Internet web site 18, which can be browsed in Internet and can exchange data with the software application 16. For example, the Internet web site 18 can be used to data analysis, add manual comments, add data to a centralized database, and generate reports (the web site 18 can generate a PDF report and send back the PDF report to the software application 16).

Figure 4:
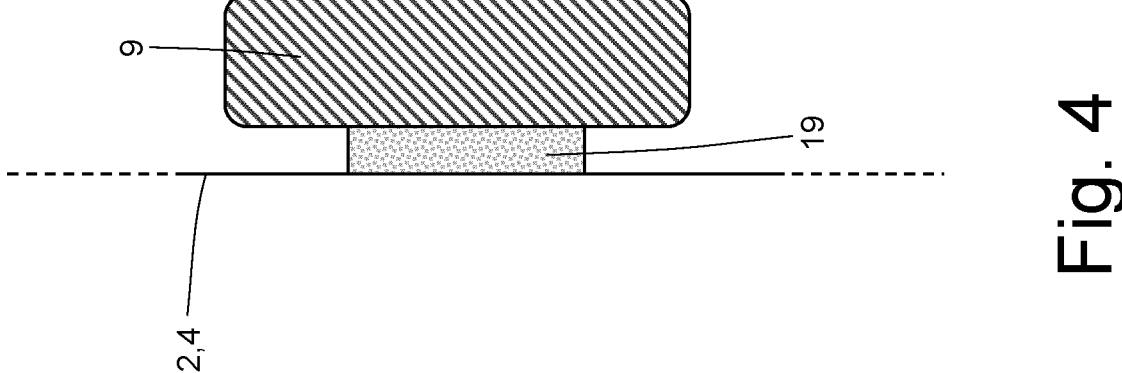
FIG. 4 is a schematic view of a rotation sensor coupled to a wheel of the agricultural tractor of FIG. 1.

According to a preferred embodiment shown in FIG. 4, each rotation sensor 9 is provided with a (permanent) magnet 19 for magnetically attaching the rotation sensor 9 to the rim of a respective wheel 2 or 4 (and in particular to the central hub of the wheel or to the wheel disc). Magnetically attaching the rotation sensor 9 to the rim of a respective wheel 2 or 4 allows a fast and easy connection/disconnection and, at the same time, a safe and reliable fixing, and allows to avoid possible interferences with fixed parts of the vehicle (for example a Central Tire Inflation System-CTIS-pipes if installed).

Figure 5:
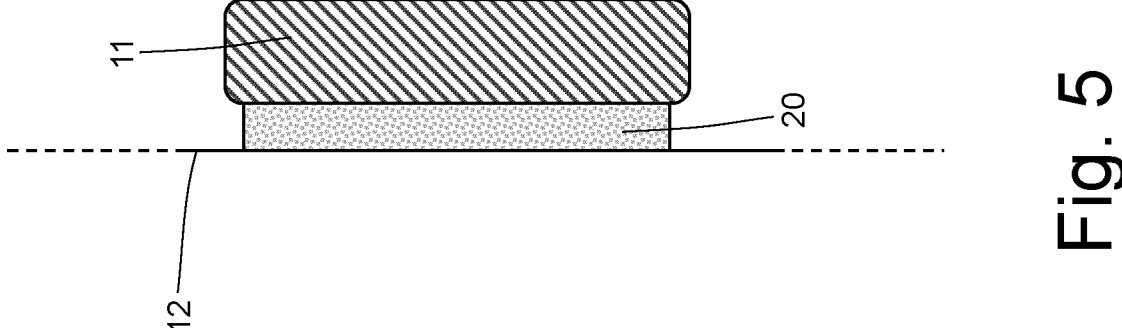
FIG. 5 is a schematic view of a distance sensor coupled to a body of the agricultural tractor of FIG. 1.

According to a preferred embodiment shown in FIG. 5, the receiver 11 of the distance sensor 10 is provided with a (permanent) magnet 20 for magnetically attaching the receiver 11 to the body 14 of the agricultural tractor 1. Magnetically attaching the receiver 11 to the body 14 allows a fast and easy connection/disconnection and, at the same time, a safe and reliable fixing.

The tire analysis system 8 can be used to perform an axle inspection when the two rotation sensor 9 are coupled to the two wheels 2 or 4 of the same (front or rear) axle (as shown in FIG. 3). When the two rotation sensor 9 are coupled to the two wheels 2 or 4 of the same (front or rear) axle (as shown in FIG. 3), the agricultural tractor 1 has to be driven (generally at a maximum speed of 5-10 km/h) for a test run on hard (i.e. stable) soil and along a (approximately) straight path enough long to allow the checked axle to make at least 5-10 revolutions (but of course a greater number of revolutions could be done, for example as many as 50-100 revolutions or even more). At the end of the test run, the control unit 15 compares the total revolutions done by the left wheel 2 or 4 with the total revolutions done by the right wheel 2 or 4: if the total number of revolutions of both wheels 2 or 4 (right and left) is the same (within a certain tolerance margin) then it is established that the two wheels 2 or 4 (right and left) of the (front or rear) axle are balanced, otherwise it is established that and two wheels 2 or 4 (right and left) of the (front or rear) axle are unbalanced and therefore a correct intervention is necessary to avoid subjecting to unnecessary mechanical stress (and thus wear) the powertrain 6.

In other words, the control unit 15 calculates an axle balance by dividing the total number of revolutions of the right wheel 2 or 4 by the total number of revolutions of the left wheel 2 or 4; when the axle balance is equal to 1 (within a certain tolerance margin) then it is established that the two wheels 2 or 4 (right and left) of the (front or rear) axle are balanced, otherwise it is established that and two wheels 2 or 4 (right and left) of the (front or rear) axle are unbalanced. The unbalance can be also calculated as absolute rotation difference among the wheels of the same axle.

Figure 6:
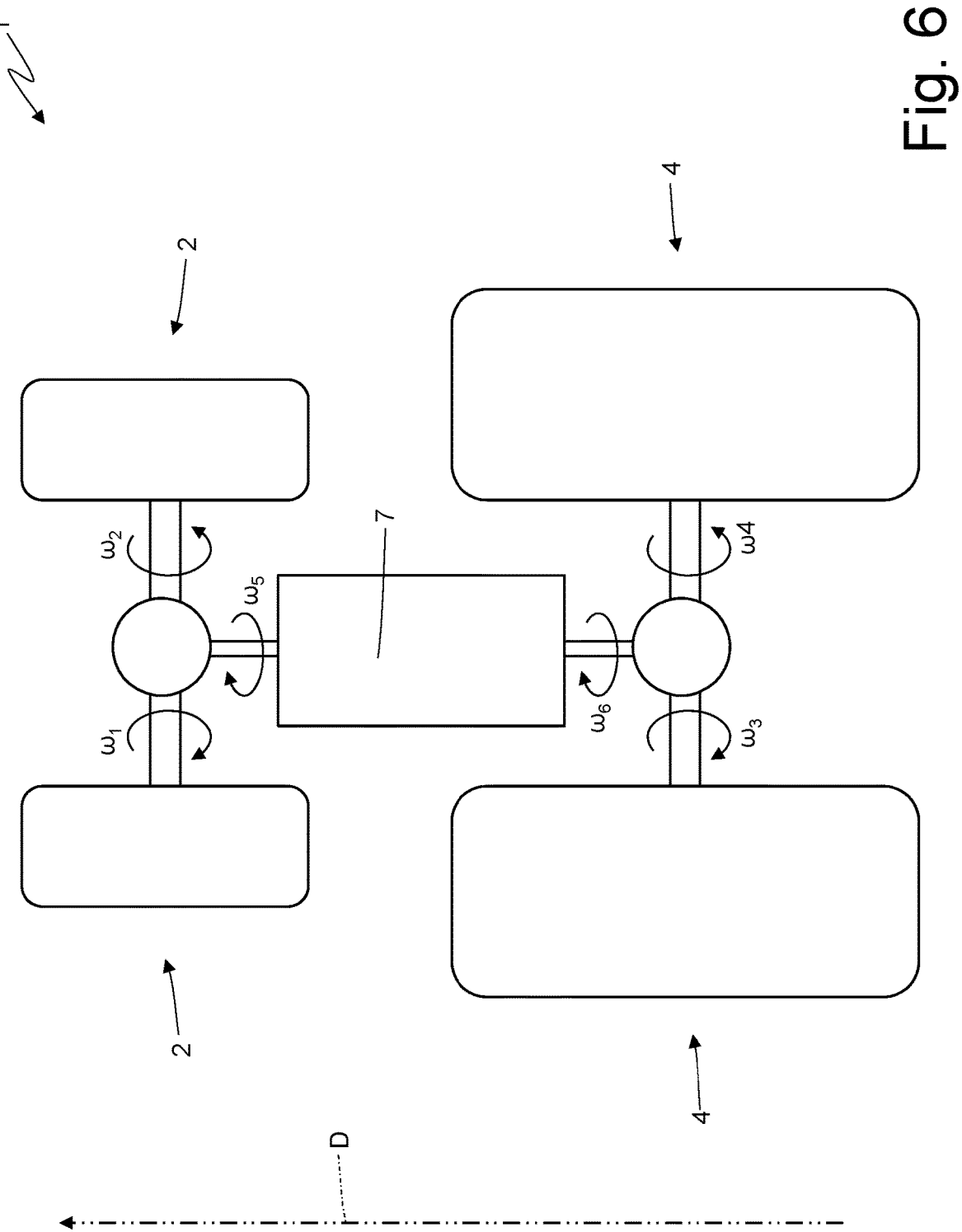
FIG. 6 is a schematic and plan views of the agricultural tractor of FIG. 1 showing some rotation speeds of various components.

Referring to FIG. 6, the axle inspection checks if the rotation speed $@_1$ is equal or not to rotation speed $@_2$ (front axle) and checks if the rotation speed $@_3$ is equal or not to rotation speed $@_4$ (rear axle), as the rotation speed is directly proportional to the total number of revolutions.

Of course the tire analysis system 8 can be used to perform an axle inspection of the front axle (by coupling the two rotation sensors 9 to both the front wheels 2) and successively the tire analysis system 8 can be used to perform an axle inspection of the rear axle (by coupling the two rotation sensors 9 to both the rear wheels 4). According to a different embodiment, four rotation sensors 9 can be used to perform at the same an axle inspection of the front axle and also of the rear axle.

The tire analysis system 8 can be used to determine the real slip when at least one rotation sensor 9 is coupled to the rear wheels 4 of the rear axle (as shown in FIG. 3): during a first test the agricultural tractor 1 has to be driven (generally at a maximum speed of 10-15 km/h) on operating conditions, on hard soil, and without working load (equipment no in operating position) applied till the rear wheels 4 turns a given number of times (for example 10, 20, 30 . . . revolutions) and it is measured the first running distance D1 at the end of the given number of revolutions, while during a second test the agricultural tractor 1 has to be driven (generally at a maximum speed of 10-15 km/h) on operating conditions, on the working field, and with load applied (equipment on operating position) till the rear wheels 4 turns the given number of times of the first test (it is not strictly necessary exactly the same turns as the tire analysis system 8 will do the required calculation in any case), and it is measured the second running distance D2 at the end of the given number of revolutions. At the end of the two tests, the control unit 15 calculates the real slip by dividing the second running distance D2 traveled divided by the number of revolutions done with load applied, by the first running distance D1 traveled divided by the number of revolutions without load applied (in other words, the tire analysis system 8 is calculating the distance driven by each rear tire revolution with and without working load, and then calculates the ratio between both results to determine the slip percentage instead of driving exactly the same number of rear tire revolutions on each condition).

The tire analysis system 8 can be used to determine the real (effective) rolling circumferences of each tire 3 and 5, the real (effective) inter-axle ratio ("IAR"), and the real (effective) lead ratio when the two rotation sensor 9 are coupled to a front wheel 2 and to a rear wheel 4 as shown in FIGS. 1 and 2.

To determine the rolling circumferences, the agricultural tractor 1 has to be driven (generally at a maximum speed of 5-10 km/h) with 4×4 (four-wheel drive) off on operating conditions on hard soil and without load applied, for a certain number of revolutions of the rear tire (normally 10) and the control unit 15 measures the total number of revolutions done by the wheels 2 and 4 and also the total running distance D: the control unit 15 calculates the real (effective) rolling circumferences of the front and rear tires 3 and 5 by dividing the total running distance D by the total number of revolutions of each axle.

In four-wheel drive mechanisms, the relationship between the total number of revolutions of the front and rear axle (in 4×4 drive mode) is a constant factor (and is determined by the cogs in the gear box, transfer case and hub reduction); this relationship is referred to as the inter axle ratio or transference ratio (also known as mechanical drive ratio) and, depending on the tractor brand and type, is normally between 1.20 and 1.50. Of course the inter axle ratio or transference ratio is a fixed and known parameter of the agricultural tractor 1 that is sometimes indicated in any of the tractor's plates, or can be obtained from the tractor's manufacturer, but if that information is not available or is difficult to obtain, it could be calculated by the system with a high degree of precision.

Referring to FIG. 6, the inter axle ratio or transference ratio is the ratio between the rotation speed $\omega_5$ (front axle) and the rotation speed $\omega_6$ (rear axle); the inter axle ratio or transference ratio can be determined also dividing the rotation speed $\omega_1$ ($\omega_2$) by the rotation speed $\omega_3$ ($\omega_4$).

Traditionally, the theoretical lead ratio is calculated by using the tire's official rolling circumference (that manufacturers published at rated conditions. i.e. at the rated inflation pressure, rated load of each tire and at 10 Km/h), using the following formula:

Lead ratio=((rolling circumference front tire*inter axle ratio)−(rolling circumference rear tire))/ (rolling circumference rear tire).

If the actual rolling circumference of the tires, under the actual load, inflation pressure, etc., is known, the actual lead can be calculated.

But the system can calculate the actual (real) lead ratio under the actual operating conditions just based on the measured revolutions of each axle, in 4×4 On and 4×4 Off conditions, even without knowing the inter axle ratio. Once the control unit 15 knows the revolutions for front and rear tires 3 and 5, in 4×4 On and 4×4 Off conditions, the control unit 15 calculates the lead ratio as follows:

$$\text{Lead ratio} = (([\text{Number of revolutions front axle} - 4 \times 4 \text{ on}]$$
$$/[\text{Number of revolutions rear axle} - 4 \times 4 \text{ on}])$$
$$/([\text{Number of revolutions front axle} - 4 \times \text{ off}]$$
$$/[\text{Number of revolutions rear axle} - 4 \times 4 \text{ off}])) - 1$$

It will also calculate the inter axle ratio as follows:

$$\text{Inter axle ratio} = [\text{Number of revolutions front axle} - 4 \times 4 \text{ on}]$$
$$/[\text{Number of revolutions rear axle} - 4 \times 4 \text{ on}]$$

Generally, in the agricultural tractor 1 the front axle must actually pull the rear axle slightly when the front axle is engaged: the calculation of this difference in traction, where the front axle pulls slightly faster than the rear axle, is called front-wheel lead. When the lead ratio is too high (for example higher than 6%), then the rear axle is turning too slowly compared to the front axle, so the rear axle is holding back the front axle, which is likely to cause front wheel slippage; the front axle undergoes too much mechanical pressure which may result in a rattling noise when you engage the front axle as well as excessive mechanical heating, and a rapid tire wear. When the lead ratio is too low (for example lower than 0%) the rear axle turns quicker than the front axle, so the rear axle pushes the front axle, which is likely to cause rear wheel slippage; the front axle loses efficiency and steering is less responsive on loose soil.

According to a preferred embodiment, the control unit 15 is configured to measure and register the ambient air pressure, the ambient air moisture, and/or the ambient air temperature as all these values influence the dimensions of the tires 3 and 5.

The embodiments described herein can be combined with each other without departing from the scope of protection of the present disclosure.

The method described above has many advantages.

First and foremost, the aforementioned method allows a very easy, quick and precise determination of many characteristic parameters of the tires 3 and 5.

Furthermore, the aforementioned method requires the presence of only one person, while the known manual determination requires the presence of at least three people (one driving the agricultural tractor 1 and two looking at the tires 3 and 5); in other words, in the aforementioned method the two persons looking at the tires 3 and 5 are substituted by the rotation sensors 9 and by the distance sensor 10 which are much more precise (the rotation sensors 9 have easily a resolution of 0.01° while a skilled person could have a maximum resolution of 1°) and easy to use (the rotation sensors 9 can be mounted/dismounted to/from the wheels 2 and 4 in few seconds).

Finally, the aforementioned method requires commercial components having a reasonable price.

LIST OF REFERENCE NUMBERS IN THE FIGURES

1 agricultural tractor
2 front wheels
3 front tires
4 rear wheels
5 rear tires 6 powertrain
7 internal combustion engine
8 tire analysis system
9 rotation sensors
10 distance sensor
11 receiver
12 body
13 beacon
14 support
15 control unit
16 software application
17 personal electronic device
18 Internet web site
19 magnet
20 magnet
D distance
$\omega_1$ rotation speed
$\omega_2$ rotation speed
$\omega_3$ rotation speed
$\omega_4$ rotation speed
$\omega_5$ rotation speed
$\omega_6$ rotation speed

The invention claimed is:

1. A tire analysis method for determining characteristic parameters of an agricultural tractor provided with two front wheels supporting two front tires and with two rear wheels supporting two rear tires, the method comprising:

mounting a first rotation sensor on a first wheel, wherein the first rotation sensor is configured to measure a number of revolutions made by the first wheel and is separate and independent from the agricultural tractor;

mounting a second rotation sensor on a second wheel, wherein the second rotation sensor is configured to measure a number of revolutions made by the second wheel and is separate and independent from the agricultural tractor;

while driving the agricultural tractor along a straight path, measuring the total number of revolutions made by the first wheel and by the second wheel under actual operating conditions of the agricultural tractor;

measuring, via a distance sensor, a distance traveled by the agricultural tractor while driving along the straight path, wherein the distance sensor comprises a receiver which is attached to a body of the agricultural tractor and a beacon placed in a fixed position on the ground nearby a travelling path of the agricultural tractor;

dismounting the first and second rotation sensors from the respective wheels after the agricultural tractor has been driven along the straight path;

determining at least one actual characteristic parameter for verifying tire setup for operation of the agricultural tractor, using the total number of revolutions made by the first wheel and by the second wheel while driving the agricultural tractor along the straight path, wherein at least a first characteristic parameter accounts for variations in actual operating conditions including at least one of: tire pressure, tire wear, and load per axle, and wherein at least a second characteristic parameter accounts for at least the measured distance traveled.

2. The method of claim 1, wherein each of the first and second rotation sensor is provided with a magnet configured to magnetically attach the respective rotation sensor to a rim of the respective wheel.

3. The method of claim 1, wherein:

the first wheel and the second wheel belong to the same axle; and a first characteristic parameter is an axle balance calculated by dividing the total number of revolutions of the first wheel by the total number of revolutions of the second wheel.

4. The method of claim 1, wherein:

the first wheel and the second wheel belong to a rear axle;

during a first test the agricultural tractor is driven under operating conditions, on hard soil, and without load applied until the rear wheels turn a given number of times and a first running distance is measured at the end of the given number of revolutions;

during a second test the agricultural tractor is driven under operating conditions, on a working field, and with load applied until the rear wheels turn the same given number of times of the first test and a second running distance is measured at the end of the given number of revolutions; and the at least second characteristic parameter comprises a real slip calculated by dividing the second running distance by the first running distance.

5. The method of claim 1, wherein:

the first wheel and the second wheel belong to a rear axle;

during a first test the agricultural tractor is driven under operating conditions, on hard soil, and without load applied until the rear wheels turn a first number of times and a first running distance is measured at the end of the first number of revolutions;

during a second test the agricultural tractor is driven under operating conditions, on a working field, and with load applied until the rear wheels turn a second number of times and a second running distance is measured at the end of the second number of revolutions; and the at least second characteristic parameter comprises a real slip calculated by dividing the second running distance per rear tire revolution by the first running distance per rear tire revolution.

6. The method of claim 5, wherein the beacon is housed on a support laying on the ground.

7. The method of claim 5, wherein the receiver is attached to a rearmost part of the body of the agricultural tractor and the beacon is placed behind the agricultural tractor.

8. The method of claim 5, wherein the receiver of the distance sensor is provided with a magnet for magnetically attaching the receiver to the body of the agricultural tractor.

9. The method of claim 1, wherein:

the first wheel and the second wheel belong to different axles; and the at least second characteristic parameter comprises a rolling circumference of each tire calculated by dividing the total running distance by the total number of revolutions.

10. The method of claim 9, wherein another characteristic parameter is an inter-axle ratio calculated as a measured number of revolutions for the front axle in a 4×4 On condition divided by a measured number of revolutions for the rear axle in the 4×4 On condition.

11. The method of claim 9, wherein another characteristic parameter is a lead ratio calculated as (([a measured number of revolutions for the front axle in a 4×4 On condition]/[a measured number of revolutions for the rear axle in the 4×4 On condition])/([a measured number of revolutions for the front axle in a 4×4 Off condition]/[a measured number of revolutions for the rear axle in a 4×4 Off condition]))−1.

12. The method of claim 11, wherein the beacon is housed on a support laying on the ground.

13. The method of claim 11, wherein the receiver is attached to a rearmost part of the body of the agricultural tractor and the beacon is placed behind the agricultural tractor.

14. The method of claim 11, wherein the distance sensor uses Ultra-Wideband Technology.

15. The method of claim 11, wherein the receiver of the distance sensor is provided with a magnet for magnetically attaching the receiver to the body of the agricultural tractor.

16. A tire analysis system for determining characteristic parameters of an agricultural tractor provided with two front wheels supporting two front tires and with two rear wheels supporting two rear tires, wherein the tire analysis system comprises:

a first rotation sensor configured, when detachably mounted on a first wheel and at least while driving the agricultural tractor along a straight path, to generate signals corresponding to a total number of revolutions made by the first wheel;

a second rotation sensor configured, when detachably mounted on a second wheel, to generate signals corresponding to a total number of revolutions made by the second wheel;

a distance sensor configured to measure a distance traveled by the agricultural tractor while driving along the straight path, wherein the distance sensor comprises a receiver which is attached to a body of the agricultural tractor and a beacon placed in a fixed position on the ground nearby a travelling path of the agricultural tractor; and a control unit configured to:

while the agricultural tractor is driving along a straight path, receive the signals from the first rotation sensor and the second rotation sensor, respectively, and measure the total number of revolutions made by the first wheel and by the second wheel under actual operating conditions of the agricultural tractor; and determine at least one actual characteristic parameter for verifying tire setup for operation of the agricultural tractor, using the total number of revolutions made by the first wheel and by the second wheel, wherein at least a first characteristic parameter accounts for variations in actual operating conditions including at least one of: tire pressure, tire wear, and load per axle, and wherein at least a second characteristic parameter accounts for at least the measured distance traveled.

17. The system of claim 16, comprising a personal electronic device having a software application running thereon and which constitutes a Human-Machine Interface (HMI) for using the tire analysis system.

18. The system of claim 17, wherein the software application is configured to browse an Internet web site and exchange data therewith.

19. The system of claim 16, wherein the receiver is attached to a rearmost part of the body of the agricultural tractor and the beacon is placed behind the agricultural tractor.

20. The system of claim 16, wherein the receiver of the distance sensor is provided with a magnet for magnetically attaching the receiver to the body of the agricultural tractor.

\* \* \* \* \*